(12) United States Patent
Starzec (10) Patent No.: US 11,924,259 B1
(45) Date of Patent: Mar. 5, 2024

(54) SYSTEM AND METHOD FOR TRANSMITTING NON-AUDIO DATA THROUGH EXISTING COMMUNICATION PROTOCOLS

(71) Applicant: T-MOBILE INNOVATIONS LLC, Overland Park, KS (US)

(72) Inventor: Matthew John Starzec, Leesburg, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/965,531

(22) Filed: Oct. 13, 2022

(51) Int. Cl.
*H04L 65/61* (2022.01)

(52) U.S. Cl.
CPC .................................... *H04L 65/61* (2022.05)

(58) Field of Classification Search
CPC ....................................................... H04L 65/61
USPC ......................................................... 709/231
See application file for complete search history.

(56) References Cited

FOREIGN PATENT DOCUMENTS

| GB | 2538853 A | * | 11/2016 | .............. H04R 3/00 |
| WO | WO-0064155 A1 | * | 10/2000 | ........... G11B 27/032 |
| WO | WO-0069100 A1 | * | 11/2000 | ........... G10L 19/008 |
| WO | WO-0221845 A1 | * | 3/2002 | ........... H04N 21/235 |

* cited by examiner

*Primary Examiner* — Glenford J Madamba
(74) *Attorney, Agent, or Firm* — Shook, Hardy & Bacon L.L.P.

(57) ABSTRACT

Methods and systems provide data transmission through unused transmission channels. In one embodiment, the method includes identifying one or more available audio channels in the communication stream available to transmit non-audio data, wherein the communication stream includes a plurality of audio channels and transmitting the non-audio data through the identified one or more available audio channels. Identifying the available audio channels includes determining each audio channels from the plurality of audio channels that is unused in the communication stream. Identifying the available audio channels may also or alternatively include identifying one or more channels from the plurality of audio channels in the communication stream as potential channels available to transmit the non-audio data and reserving the potential channels for transmitting the non-audio data.

20 Claims, 5 Drawing Sheets

SYSTEM AND METHOD FOR TRANSMITTING NON-AUDIO DATA THROUGH EXISTING COMMUNICATION PROTOCOLS

BACKGROUND

Sensors, meters, detectors and other devices, modules, machines, and systems are being deployed in everyday life through multiple different applications in every field. These technologies capture and translate different attributes into digital format that increases capability of monitoring, observing, and reporting data around us. These devices and sensing technologies are being used in innovative applications in healthcare, fitness, manufacturing, and everyday life. These devices and systems produce important information and exchange data that need to be transmitted to other devices, administration systems, or a central system through a network. These administration systems or a central system collect and organize the data in order to use the data for the future. They participate in network traffic by transmitting data on a regular basis. Conventional systems use additional communication links to send non-audio data through the network such as an additional Ethernet connection, an additional radio link, a wi-fi link, Bluetooth, Internet of Things (IOT) protocols such as MQTT, HTTP, CoAP, etc., proprietary communications protocols, other communication protocols or the like to transmit the data from sensors and others systems. A solution is needed that can utilize present network connections to allow transmit of data from sensors and other systems.

SUMMARY

Embodiments of the present disclosure related to, among other things, a system and method to transmit data through existing communication protocols. In particular, embodiments described herein identify channels that can be used to transmit data. In some embodiments, identification of one or more channels can include determining unused channels in streams. In other embodiments, identification of channels can include reserving and blocking one or more channels in streams for transmission of data. In some embodiments, the non-audio data is decoded into the identified channel to prepare the data for transmission. In some embodiments, the non-audio data is then transmitted along with the other data in the channels. For example, unused audio channels are identified and the additional sensor data is transmitted along with audio data in unused audio channels.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Devices and systems that regularly collect and transmit data have been embedded in everyday lives in every imaginable application. Different systems and devices regularly collect data such as various parameters of environment data, population cluster data, structural integrity of infrastructure data, technology processes, energy data and the like to monitor, analyze, and effectively manage every aspect of everyday life. Devices can include any sensors such as environmental sensors (temperature, humidity, wind speed, air quality, specialized or the like), motion, quality, etc., RFID scans, low bandwidth sensors or the like. Devices can also include real time sensors where lower latency is required or modular or interchangeable sensors. All these devices and systems collect data and information that needs to be transmitted to other devices or administration system that can collect, organize, and/or analyze data for future use. Conventional systems typically use additional communication protocols to transfer data from systems and devices where the data originates to systems such as an administration system or a central system where the data can be transmitted to, collected, and/or sorted. The communication technologies used by these devices and systems are usually technologies that create scalable network for transmitting data from devices to a desired location. Conventional systems typically create additional communication protocols to transmit the data from devices and systems. Conventional systems use additional connections to send data through the network such as an additional Ethernet connection, an additional radio link, a wi-fi link, Bluetooth, Internet of Things (IOT) protocols such as MQTT, HTTP, CoAP, etc., proprietary communications protocols, other communication protocols or the like to transmit the data from sensors and others systems. A solution is needed that can utilize present network connections to allow transmit of data from sensors and other systems.

Figure 1:
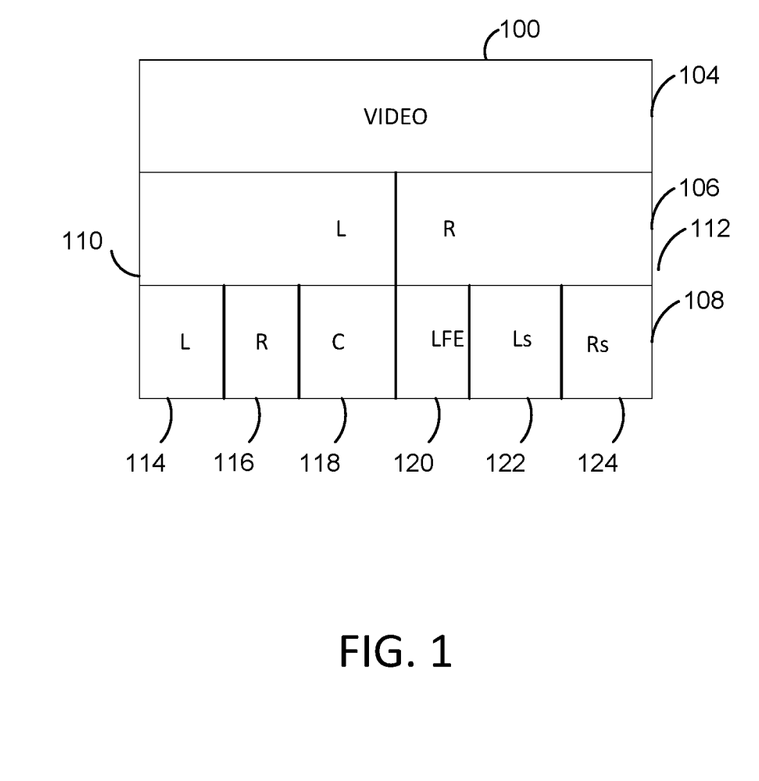
FIG. 1 is a diagram of an exemplary transmission protocol involving the transmission of a video channel with multichannel audio streams.

Accordingly, embodiments of the present disclosure are directed to utilizing communication protocols already present in systems that can allow for the transmission of non-audio data. For example, some transmissions protocols have the capability of multiple internal channels. In one example, video transmission streams can have multi-channel audio. These multi-channel audio can be used for multiple audio source files, different audio layout, transforming inputs into streamable audio, stereo, multi-channel stereo, spatial audio or the like. For example, turning to FIG. 1, FIG. 1 is an exemplary transmission protocol of a video channel with multi-channel audio streams. As seen in FIG. 1, an exemplary transmission file 100 can include multiple streams 104, 106, and 108. Stream 104 can be used to transmit video. Another stream 106 can be a stereo audio stream with two channels: left 110 and right 112. Another stream 108 can include a surround audio stream with six channels: front left channel 114, front right channel 116, center channel 118, low frequency effects 120 for a subwoofer, back left 122, and back right 124.

In some examples, these audio streams might be partially unused. While some of these streams are being used to transmit data, some channels or some part of these streams might be unused. Embodiments of the present disclosure can be used to transmit data in unused transmission channels. In one embodiment, unused audio channels in a video stream can be used to transmit non-audio data. Non-audio data can include data that is not typically transmitted through the existing communication protocols. Examples of non-audio data can include data from devices and systems such as data from sensors, meters, detectors and other devices, modules, machines, and systems. While non-audio data is being referenced herein, it should be understood that any kind of data (even additional audio data) can be transmitted through the unused audio channels. Embodiments of the present disclosure provide a method to transmit the non-audio data through existing communication protocols such as audio channels in video streams. It should be understood that any existing transmission protocol can be used to transmit non-audio data so that the non-audio data shares space with data that is being already transmitted through the existing transmission protocol. For example, the non-audio data shares space with the audio data in the audio channels of a video stream.

An advantage of the embodiments of the present disclosure include using already existing communication links to transmit data from additional devices and systems without the need for additional communication links. Additionally, devices such as sensors that periodically record data can also be made to be modular or interchangeable. For example, these devices can plug into a camera and can obtains an additional source of power or an only source of power needed to operate the device. For example, a low power requirement sensor can be plugged into a video camera and get the power from the camera or the battery of the sensor can be trickle charged from the camera. As such, connecting these external devices to a video camera provides not only the advantage of using existing video streams to transmit external non-audio data but also provides a battery source for the one or more external devices. For example, in a football fame, one or more sensors can be attached either wirelessly or tethered to TV cameras. The sensors could track a player speed, a ball placement, player locations, wind speed and/or direction and the like. The information from these sensors can be transmitted using existing video streams from the TV camera and transmitted back to a central system such as the production studio. As such, the external non-audio data from the sensors can be transmitted back to the central system using the audio channels. This device can be decoded for analysis and storage when received.

Figure 2A:
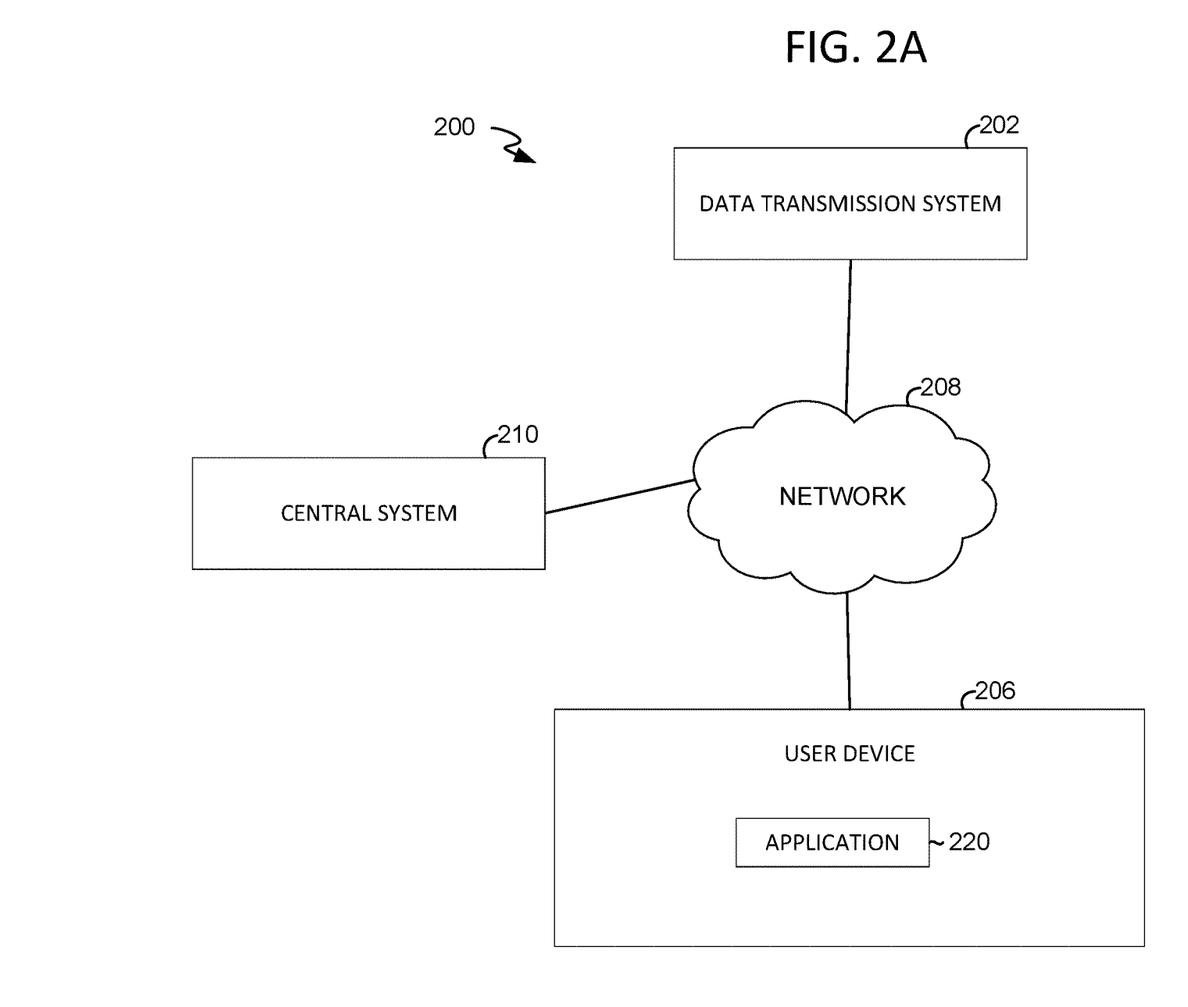
FIG. 2A is a diagram of an environment that can be used to perform the transmitting of data method, according to embodiments of the present disclosure.

Turning to FIG. 2A, FIG. 2A is a diagram of an environment 200 that can be used to perform the transmission of data through unused channels method, according to embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 4.

Environment 200 is an example of a suitable architecture for implementing certain aspects of the present disclosure. In one embodiment, environment 200 includes, among other components not shown, a data transmission system 202, a central system 210 and a user device 206. Each of the data transmission system 202 and user device 206 shown in FIG. 1 can comprise one or more computer devices, such as the computing device 400 of FIG. 4 discussed below. The data transmission system 202 may be embodied at least partially by the instructions corresponding to application 220. Therefore, the data transmission system 202 can operate on a server or on a user device, such as user device 206, or partially on multiple devices. As shown in FIG. 1, the data transmission system 202, the central system 210 and the user device 206 can communicate via a network 208, which may include, without limitation, one or more local area networks (LANs) and/or wide area networks (WANs). Such networking environments are commonplace in offices, enterprise-wide computer networks, intranets, and the Internet. It should be understood that any number of user devices and data transmission systems may be employed within environment 200 within the scope of the present disclosure. Each may comprise a single device or multiple devices cooperating in a distributed environment. For instance, the data transmission system 202 and the central system 210 could be provided by multiple devices collectively providing the functionality of the data transmission system 202 as described herein. Additionally, other components not shown may also be included within the network environment.

It should be understood that any number of user devices 206, data transmission systems 202, central systems 210 and other components can be employed within the operating environment 200 within the scope of the present disclosure. Each can comprise a single device or multiple devices cooperating in a distributed environment.

User device 206 can be any type of computing device capable of being operated by a user. For example, in some implementations, user device 206 is the type of computing device described in relation to FIG. 4. By way of example and not limitation, a user device 206 may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 206 can include one or more processors, and one or more computer-readable media. The computer-readable media may include computer-readable instructions executable by the one or more processors. The instructions may be embodied by one or more applications, such as application 220 shown in FIG. 2A. Application 220 is referred to as a single application for simplicity, but its functionality can be embodied by one or more applications in practice. As indicated above, the other user devices can include one or more applications similar to application 220.

The application(s) may generally be any application capable of facilitating performance of data transmission through unused channels (e.g., via the exchange of information between the user devices and the data transmission system 202). In some implementations, the application(s) comprises a web application, which can run in a web browser, and could be hosted at least partially on the server-side of environment 200. In addition, or instead, the application(s) can comprise a dedicated application, such as an application having image processing functionality. In some cases, the application is integrated into the operating system (e.g., as a service). It is therefore contemplated herein that "application" be interpreted broadly.

In accordance with embodiments herein, the application 220 can either initiate the data transmission system 202 to facilitate data transmission through unused channels method via a set of operations initiated to display the data transmission through unused channels result on a display of to the user device 206.

In embodiments, the data transmission system 202 identifies potential channels for non-audio data transmission. For example, the data transmission system 202 can identify one or more unused channels in an audio stream to transmit non-audio data. Unused channels can be channels that are not being used to transmit data such as audio data and therefore are unused in the stream. Some examples of identifying channels includes determining unused one or more channels in the stream. For example, the data transmission system 202 may determine that the Right channel 116 in stream 108 is not being used to transmit any audio stream and the other channels 114, 118, 120, 122, and 124 are being used to transmit audio data. As such, since the right channel 116 is determined to be unused, the right channel 116 can be identified as a channel that can be used to transmit non-audio data. In another example, the data transmission system 202 can determine that both left channel 110 and right channel 112 are being used in stream 106 to transmit audio data and can identify one channel (for example the right channel 112) as a channel that will be used to transmit non-audio data and reserve the right channel 112 to be used for transmission of non-audio data. In these examples, the data transmission system 202 identifies one or more channels to transmit non-audio data. By reserving the one or more channels for non-audio data transmission, the data transmission system 202 allows the audio data or any other data to be transmitted in unreserved channels and the non-audio data to be transmitted in the reserved channels. It should be understood that non-audio data can be any data from external or internal devices that need transmission protocols to transmit their data. It should be understood that in addition to non-audio data, the data transmission system 202 can transmit any digital data through the identified unused channels. For example, data requiring low bandwidth can be transmitted through the unused channels. In another example, data requiring high bandwidth can also be transmitted through the unused channels. For data requiring high bandwidth, the data transmission system 202 can determine how many channels are needed to transmit the high bandwidth data and then identify and reserve the determined number of channels in the stream.

Additionally, in some embodiments, the data transmission system 202 encodes the non-audio data to prepare the non-audio data for transmission. The device transmission system 202 uses the identified unused channels in the stream to transmit the non-audio data through the identified channels. The video streams are then transmitted to another location such as a central system 210. When the data from the stream is obtained by a central system 210, the central system 210 can obtain the non-audio data in the obtained transmitted data by removing off the non-audio data from the specific identified channel and decode the non-audio data.

The central system 210 can additionally collect the non-audio data, organize the non-audio data, or transmit the non-audio data for further processing.

For cloud-based implementations, the instructions on data transmission system 202 may implement one or more aspects of the data transmission system 202, and application 220 may be utilized by a user and/or system to interface with the functionality implemented on server(s). In some cases, application 220 comprises a web browser. In other cases, data transmission system 202 may not be required. For example, the functionality described in relation to the data transmission system 202 can be implemented completely on a user device, such as user device 206.

These components may be in addition to other components that provide further additional functions beyond the features described herein. The data transmission system 202 can be implemented using one or more devices, one or more platforms with corresponding application programming interfaces, cloud infrastructure, and the like. While the data transmission system 202 is shown separate from the user device 206 in the configuration of FIG. 2A, it should be understood that in other configurations, some or all of the functions of the data transmission system 202 can be provided on the user device 206.

Figure 2B:
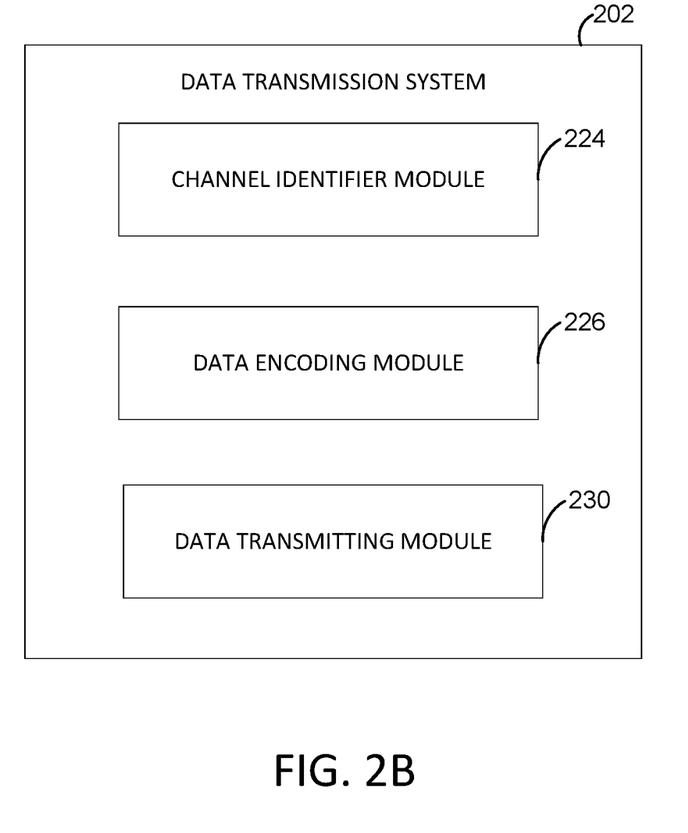
FIG. 2B provides an exemplary data transmit system, in accordance with embodiments described herein.

Turning to FIG. 2B, FIG. 2B provides an exemplary data transmission system 202. As shown, an exemplary data transmission system 202 includes a channel identifier module 224, a data decoding module 226, and a data transmitting module 230. As can be appreciated, any number of components may be used to perform the various functionalities described herein.

In accordance with some aspects of the operating environment 200, the channel identifier module 224 identifies channels that can be used to transmit non-audio data. Some examples of identifying channels includes determining one or more unused channels in the stream. For example, the channel identifier module 224 may determine that the right channel 116 in stream 108 is not being used to transmit any audio stream and the other channels 114, 118, 120, 122, 124 are being used to transmit audio data. As such, since the right channel 116 is determined to be unused, the right channel 116 can be identified as a channel that can be used to transmit non-audio data. Other examples of identifying channels include reserving one or more channels in the stream that can be used to transmit non-audio data. For example, the channel identifier module 224 can determine that both left channel 110 and right channel 112 are being used in stream 106 to transmit audio data and can identify one channel (for example the right channel 112) as a channel that will be used to transmit non-audio data and reserve the right channel 112 to be used for transmission of non-audio data. As such, the channel identifier module 224 can reserve one or more channels for non-audio data transmission even though those channels may be used to transmit other data such as audio. By reserving the one or more channels for non-audio data transmission, the channel identifier module 224 allows the audio data or any other data to be transmitted in unreserved channels and the non-audio data to be transmitted in the reserved channels. It should be understood that in addition to non-audio data, the channel identifier module 224 can transmit any digital data through the identified unused channels. For example, data requiring low bandwidth can be transmitted through the unused channels. In another example, data requiring high bandwidth can also be transmitted through the unused channels. For data requiring high bandwidth, the channel identifier module 224 can determine how many channels are needed to transmit the high bandwidth data and then identify and reserve the determined number of channels in the stream.

In accordance with some aspects of operating environment 200, the data encoding module 226 encodes the non-audio data into the identified unused channels. The data transmitting module 230 transmits the stream of data consisting of non-audio data and other data in the stream such as audio and video data.

Figure 3:
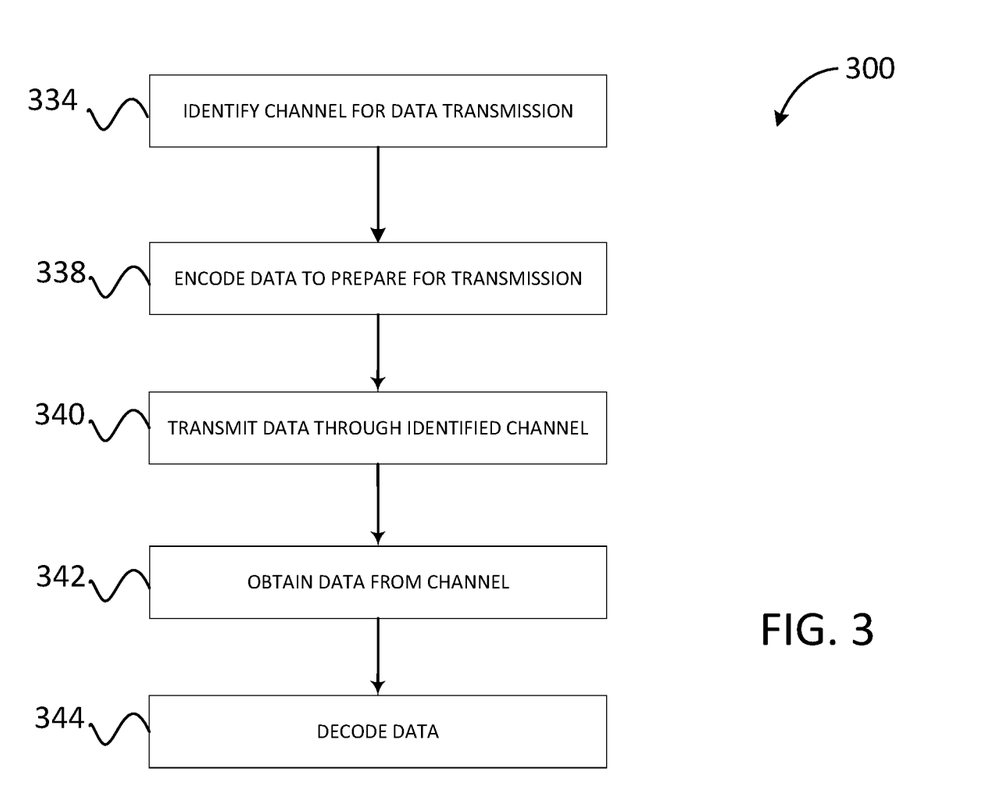
FIG. 3 is a flow diagram illustrating an exemplary method for implementing the data transmission in accordance with one embodiment of the present disclosure.

With reference to FIG. 3, FIG. 3 is a flow diagram illustrating an exemplary method 300 for facilitating data transmission in accordance with one embodiment of the present disclosure. A processing device such as a user device, a server, a cloud computing service or the like implements the exemplary method 300. The data transmission system can initiate the in-building mobile coverage analytics method 300 as described herein.

As shown in FIG. 3, in one embodiment, at block 334, a data transmission system identifies one or more channels for non-audio data transmission. In some embodiments, the data transmission system identifies potential channels for non-audio data transmission. For example, the data transmission system can identify one or more unused channels in an audio stream to transmit non-audio data. Unused channels can be channels that are not being used to transmit data such as audio data and therefore are unused in the stream. Some examples of identifying channels includes determining unused one or more channels in the stream. For example, the data transmission system may determine that the right channel 116 in stream 108 is not being used to transmit any audio stream and the other channels 114, 118, 120, 122, 124 are being used to transmit audio data. As such, since the right channel 116 is determined to be unused, the right channel 116 can be identified as a channel that can be used to transmit non-audio data.

In another example, the data transmission system 202 can determine that both left channel 110 and right channel 112 are being used in stream 106 to transmit audio data and can identify one channel (for example the right channel 112) as a channel that will be used to transmit non-audio data and reserve the right channel 112 to be used for transmission of non-audio data. In these examples, the data transmission system 202 identifies one or more channels to transmit non-audio data. By reserving the one or more channels for non-audio data transmission, the data transmission system 202 allows the audio data or any other data to be transmitted in unreserved channels and the non-audio data to be transmitted in the reserved channels. It should be understood that in addition to non-audio data, the data transmission system 202 can transmit any digital data through the identified unused channels. For example, data requiring low bandwidth can be transmitted through the unused channels. In another example, data requiring high bandwidth can also be transmitted through the unused channels. For data requiring high bandwidth, the data transmission system 202 can determine how many channels are needed to transmit the high bandwidth data and then identify and reserve the determined number of channels in the stream. It should be understood that any transmission protocol can be used to transmit non-audio data so that the non-audio data shares space with already existing transmission data.

In another example, the data transmission can include transmitting through video streams that include audio channels. For example, audio coding formats associated with HEVC/H.265 video encoding such as MPEG-H and AC-4 can be used. In another example, other audio codecs can be used. In one example, MPEG-H can support eight channels of audio. Some non-audio data can include sensor data that may have a low to medium bandwidth requirement and can be easily encoded using an unused audio channel within MPEG-H or any other audio coding format. In some examples, data being transmitted through the transmission channels may have a higher bandwidth requirement and as such, low bandwidth non-audio data can be easily included along with the higher bandwidth data for transmission. For example, audio encoding may have a higher bandwidth requirement and a low bandwidth sensor data can be included in audio channels and transmitted along with the audio data.

The data transmission system, at block 338, encodes the non-audio data in the identified channels to prepare the data for transmission. It should be understood that any method for encoding the data can be used. In one embodiment, the non-audio data is converted into a specific format for secure transmission. The format can be governed by the technology of the stream, non-audio data being transmitted in neighboring channels and/or streams, or the like. In another embodiment, coding methods such as Non Return to Zero, Non Return to Zero—Level, Non Return to Zero—Inverted, Bi-phase Encoding, Bi-phase Manchester, Differential Manchester, Block Coding or the like can be used to encode the non-audio data. In another embodiment, the non-audio data can be combined with the data in the other channels and/or streams and can be encoded together for transmission.

The data transmission system, at block 340, transmits the non-audio data through the identified channel in the stream. For example, the data transmission system transmits the non-audio data through one or more available audio channels in the stream. In another example, the data transmission system can transmit the non-audio data along with the audio data in the stream.

A central system, at block 342, obtains the data from the stream that was transmitted. The central system 210 can obtain the channel data by removing off the non-audio data from the specific identified channel and decoding the non-audio data. In another example, when the communication stream transmits the non-audio data (such as the sensor data) along with the audio data, the receiving unit on the receiving end can receive the communications stream and identify the sensor data based on an identification of one or more audio channels in the communication stream that are not being used to transmit audio data. The sensor data or any non-audio data can be separated from those channels in the communication stream.

The central system, at block 344, can decode the non-audio data that was removed from the identified channel. Additionally, the central system can then collect the non-audio data, organize the non-audio data, or transmit the non-audio data for further processing.

Figure 4:
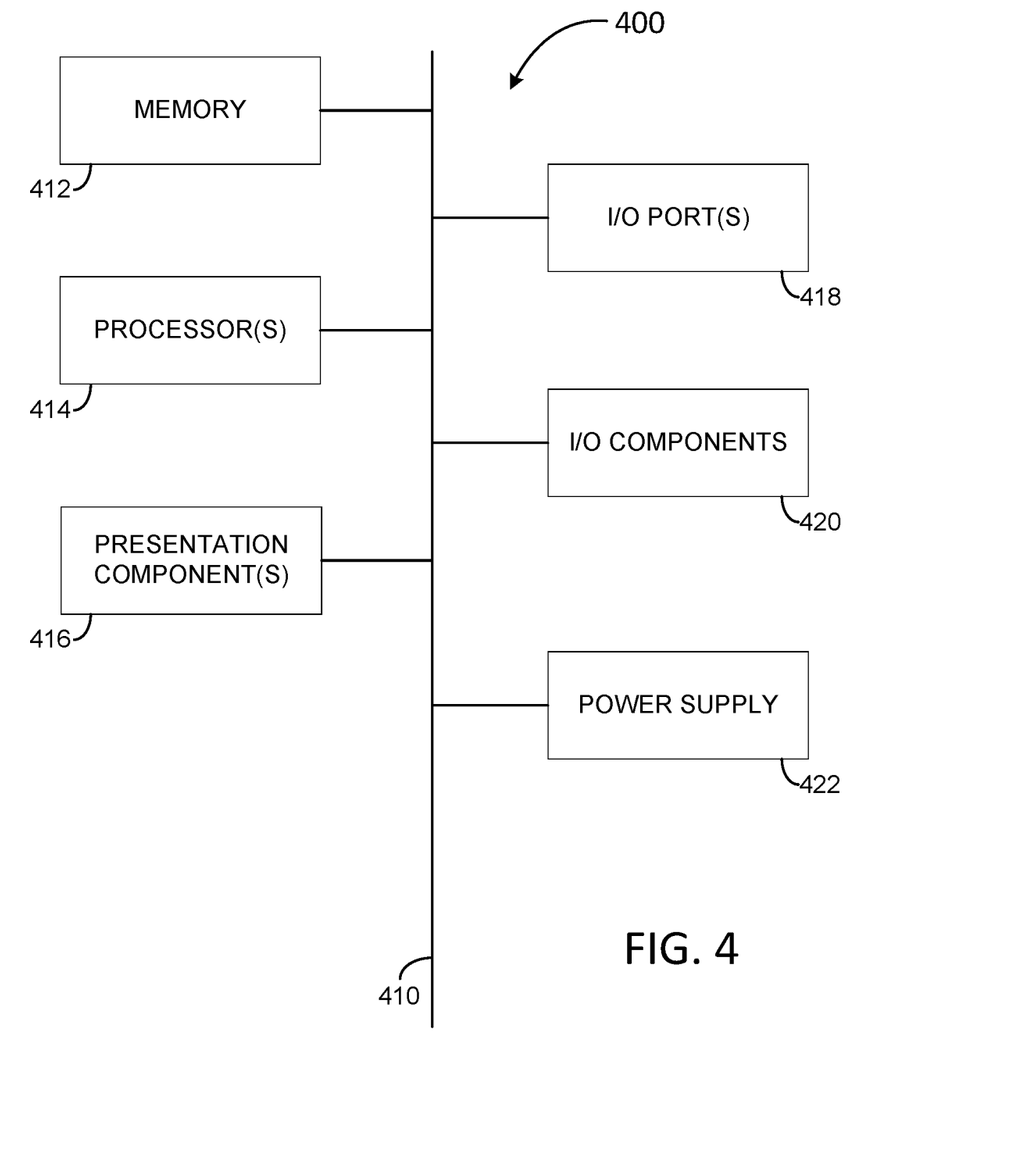
FIG. 4 is an exemplary operating environment for implementing embodiments of the present technology.

Having described implementations of the present disclosure, an exemplary operating environment in which embodiments of the present technology may be implemented is described below in order to provide a general context for various aspects of the present disclosure. Referring to FIG. 4, an exemplary operating environment for implementing embodiments of the present technology is shown and designated generally as computing device 400. Computing device 400 is but one example of a suitable computing environment and is not intended to suggest any limitation as to the scope of use or functionality of the technology described herein. Neither should the computing device 400 be interpreted as having any dependency or requirement relating to any one or combination of components illustrated.

The technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology described herein may be practiced in a variety of system configurations, including hand-held devices, consumer electronics, general-purpose computers, more specialty computing devices, etc. The technology described herein may also be practiced in distributed computing environments where tasks are performed by remote-processing devices that are linked through a communications network.

With reference to FIG. 4, computing device 400 includes bus 510 that directly or indirectly couples the following devices: memory 412, one or more processors 414, one or more presentation components 416, input/output (I/O) ports 418, input/output components 420, and illustrative power supply 422. Bus 510 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 4 and reference to "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 412 includes computer storage media in the form of volatile and/or nonvolatile memory. The memory may be removable, non-removable, or a combination thereof. Exemplary hardware devices include solid-state memory, hard drives, optical-disc drives, etc. Computing device 400 includes one or more processors that read data from various entities such as memory 412 or I/O components 420. Presentation component(s) 416 present data indications to a user and/or system or other device. Exemplary presentation components include a display device, speaker, printing component, vibrating component, etc.

I/O ports 418 allow computing device 400 to be logically coupled to other devices including I/O components 420, some of which may be built in. Illustrative components include a microphone, joystick, game pad, satellite dish, scanner, printer, wireless device, etc. The I/O components 420 may provide a natural user and/or system interface (NUI) that processes air gestures, voice, or other physiological inputs generated by a user and/or system. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 400. The computing device 400 may be equipped with depth cameras, such as, stereoscopic camera systems, infrared camera systems, RGB camera systems, and combinations of these for gesture detection and recognition. Additionally, the computing device 400 may be equipped with accelerometers or gyroscopes that enable detection of motion.

Aspects of the present technology have been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however, the distributed computing environment depicted herein is merely exemplary. Components can be configured for performing certain embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for transmitting non-audio data through a communication stream, the method comprising:
   determining the communication stream is associated with an audio-visual codec, the audio-visual codec comprising one or more audio channels;
   identifying an unused audio channel of the one or more audio channels that is not being used to transmit audio data;
   identifying non-audio data that is capable of being communicated through the unused audio channel, wherein the non-audio data is sensor data that has a bandwidth size below a pre-determined threshold; and
   transmitting the non-audio data through the unused audio channels.

2. The method of claim 1, wherein the communication stream is a video stream.

3. The method of claim 1, wherein identifying the one or more audio channels comprises:
   identifying one or more channels in the communication stream as potential channels available to transmit the non-audio data; and
   reserving the potential channels for transmitting the non-audio data.

4. The method of claim 3, further comprising blocking data other than the non-audio data to be transmitted through the potential channels.

5. The method of claim 1, wherein the non-audio data is sensor data from external devices.

6. The method of claim 5, further comprising:
   receiving the audio data and the sensor data from the communication stream;
   identifying the sensor data, wherein the identification of the sensor data is based on the identification of the one or more audio channels in the communication stream that are not being used to transmit the audio data; and
   obtaining the sensor data from the communication stream.

7. The method of claim 5, wherein the sensor data has a low to medium bandwidth requirement.

8. One or more computer-readable media having a plurality of executable instructions embodied thereon, which, when executed by one or more processors, cause the one or more processors to perform a method for transmitting non-audio data through a communication stream, the method comprising:
   determining the communication stream is associated with an audio-visual codec, the audio-visual codec comprising one or more audio channels;
   identifying an unused audio channel of the one or more audio channels that is not being used to transmit audio data;
   identifying non-audio data that is capable of being communicated through the unused audio channel, wherein the non-audio data is sensor data that has a bandwidth size below a pre-determined threshold; and
   transmitting the non-audio data through the identified one or more available unused audio channels.

9. The method of claim 8, wherein the communication stream is a video stream.

10. The method of claim 8, wherein identifying the one or more audio channels comprises:
    identifying one or more channels in the communication stream as potential channels available to transmit the non-audio data; and
    reserving the potential channels for transmitting the non-audio data.

11. The method of claim 10, further comprising blocking data other than the non-audio data to be transmitted through the potential channels.

12. The method of claim 8, wherein the non-audio data is sensor data from external devices.

13. The method of claim 12, further comprising:
    receiving the audio data and sensor data from the communication stream;
    identifying the sensor data, wherein the identification of the sensor data is based on the identification of the one or more audio channels in the communication stream that are not being used to transmit the audio data; and
    obtaining the sensor data from the communication stream.

14. The method of claim 12, wherein the sensor data has a low to medium bandwidth requirement.

15. A computing system comprising:
    one or more processors; and one or more non-transitory computer-readable storage media, coupled with the one or more processors, having instructions stored thereon, which, when executed by the one or more processors, cause the computing system to:

determine a communication stream is associated with an audio-visual codec, the audio-visual codec comprising one or more audio channels;

identify an unused audio channel of the one or more audio channels that is not being used to transmit audio data;

identify non-audio data that is capable of being communicated through the unused audio channel, wherein the non-audio data is sensor data that has a bandwidth size below a pre-determined threshold; and transmit the non-audio data through the unused audio channel.

16. The computing system of claim 15, wherein identifying the one or more available audio channel comprises:

identifying one or more channels in the communication stream as potential channels available to transmit the non-audio data;

reserving the potential channels for transmitting the non-audio data; and blocking data other than the non-audio data to be transmitted through the potential channels.

17. The method of claim 1, wherein the one or more audio channels in the communication stream comprise at least a first audio channel and a second audio channel, wherein both the first audio channel and the second audio channel are each an output of a separate audio sensor on a user device.

18. The method of claim 17, wherein the one or more audio channels in the communication stream comprise at least a video channel, wherein the video channel is an output from the user device.

19. The method of claim 1, wherein the sensor data is retrieved from an external sensor that is attached to a user device.

20. The method of claim 19, wherein the external sensor measures a predetermined measurement in real-time.

* * * * *